(12) United States Patent
Zhu et al.

(10) Patent No.: US 12,289,663 B2
(45) Date of Patent: Apr. 29, 2025

(54) MANAGING ACCESS REQUESTS IN A REDUNDANT NETWORK ENVIRONMENT

(71) Applicant: T-MOBILE INNOVATIONS LLC, Overland Park, KS (US)

(72) Inventors: Lei Zhu, Overland Park, KS (US); Deepesh Belwal, Ashburn, VA (US); Anuj Sharma, Broadlands, VA (US); Ramesh Kumar Golla, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 448 days.

(21) Appl. No.: 17/566,899

(22) Filed: Dec. 31, 2021

(65) Prior Publication Data

US 2023/0217351 A1 Jul. 6, 2023

(51) Int. Cl.
*H04W 48/04* (2009.01)
*H04W 48/20* (2009.01)

(52) U.S. Cl.
CPC ........... *H04W 48/04* (2013.01); *H04W 48/20* (2013.01)

(58) Field of Classification Search
CPC .............................. H04W 48/04; H04W 48/20
See application file for complete search history.

(56) References Cited

U.S. PATENT DOCUMENTS 9,131,423 B1 * 9/2015 Vargantwar ........... H04W 36/32
9,432,928 B1 * 8/2016 Keller .................... H04W 48/06
9,497,681 B2 * 11/2016 Dimou .................. H04W 36/20

FOREIGN PATENT DOCUMENTS

CA           3151958 A1 * 9/2022  .............. H04W 4/14

* cited by examiner

*Primary Examiner* — Chi H Pham
*Assistant Examiner* — Samuel Dilan Rutnam
(74) *Attorney, Agent, or Firm* — SHOOK, HARDY & BACON L.L.P.

(57) ABSTRACT

Embodiments of the present disclosure are directed to systems and methods for managing attachment requests for UEs in a wireless network environment comprising a first set of base stations and a second set of base stations when the first and second set of base stations have at least one unique network characteristic. By rejecting attachment requests to UEs attempting to access one or more base stations of the second set of base stations, the conventional cell selection and attachment process will drive UEs to attach to the first set of base stations.

19 Claims, 5 Drawing Sheets

MANAGING ACCESS REQUESTS IN A REDUNDANT NETWORK ENVIRONMENT

SUMMARY

The present disclosure is directed to managing which wireless access points a particular user device may access when in a redundant coverage environment, substantially as shown and/or described in connection with at least one of the Figures, and as set forth more completely in the claims.

According to various aspects of the technology, access requests for user devices are selectively rejected based on one or more network parameters when in redundant coverage environment. As network access technologies evolve or business consolidation takes place, a single network operator may find that they have created an environment with redundant coverage by two different sets of base stations. Conventionally, a user device will perform cell selection and attachment based on what is determined to be the best connection for the user device. In situations with redundant coverage, the network operator may desire to drive attachments towards a particular set of base stations and wind-down utilization of another. By adding one set of base stations to a denied list, a requesting UE's attachment request will be rejected and the conventional cell selection will continue to attempt to attach to other base stations until a base station not on the denied list is selected.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 802.11x, and the like. The term "operator" is used to refer to an entity (e.g., a corporation) that provides networked connectivity to one or more UEs; examples of operators include wireless telecommunication carriers such as T-Mobile, AT&T, Verizon, and the like. The term "base station" is used in its generic and literal sense and refers to any radio station that transmits and/or receives signals to/from one or more destinations (e.g., UEs); a macro cell, small cell, and femto cell are all considered a base station for the purpose of the present disclosure. Base stations may also take the form of being extra-terrestrial, that is, detached from or detachably coupled to and above the ground (e.g., low earth orbit satellites, aircraft, a balloon)

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, complex wireless telecommunication networks are used to provide wireless connectivity to potentially large number of UEs. For a variety of reasons, a network operator may have duplicate, erroneous, or excess base stations in a particular area. For example, as technology evolves, a network operator may deploy a newer-generation NAT without decommissioning an older-generation NAT so that the operator's wireless subscribers that utilize the older-generation NAT are not left without connectivity while also providing improved service to subscribers that have opted to upgrade to the newer-generation NAT. In another example, in the instance where two different carriers merge (or are otherwise consolidated) into a single operator, the consolidated operator may be capable of serving UEs in a particular area with a single base station, even if the both of the legacy operators had separate base stations that served the particular area—meaning that one of the legacy base stations is duplicitous/erroneous. It is generally in the best interest of network operators to maintain the fewest number of base stations necessary to maintain a desirable level of service for the customer, due to the cost (e.g., power, tower lease, maintenance, etc.) of each base station. That said, consolidating network assets, including base stations, has historically been done manually, resulting in consolidation either being too fast (creating unacceptable coverage gaps for subscribers) or too slow (leaving operators to have unnecessary base station expenditures).

In order to solve this problem, the present disclosure is directed to systems, methods, and computer readable media that provides for managing access requests in a redundant network environment which, in some aspects may be leveraged as an improvement for consolidating wireless network assets. When a requesting UE attempts to attach (i.e., establish a wirelessly connected session) with a particular base station, the network operator will consider one or more parameters in order to determine whether the requesting UE's attachment request will be approved or rejected. If the requesting UE's attachment request is rejected, the requesting UE will continue to request attachment to other available base stations until its attachment request is approved. In this manner, an operator can control which base stations a UE can connect to, particularly in an environment where two or more potentially-excessive base stations are available to the UE. If, after an operator-designated time, a less-utilized base station has below a threshold utilization based on the parameter-based steering to a more-utilized base station, the less-utilized base station may be decommissioned.

Accordingly, a first aspect of the present disclosure is directed to a method for managing attachment requests comprising determining a first coverage area and a second coverage area, the first coverage area comprising a first base station, wherein a first boundary between the first coverage area and the second coverage area is defined by one or more network parameters exceeding a first predetermined threshold. The method further comprises wirelessly receiving, at a second base station, an attachment request by a first UE. The method further comprises rejecting the attachment request based on a determination that the first UE is located within the first coverage area.

A second aspect of the present disclosure is directed to a system for suspect device filtering in a wireless communication network, the system comprising one or more computer components configured to perform a method comprising determining a first coverage area and a second coverage area, the first coverage area comprising a first base station, wherein a first boundary between the first coverage area and the second coverage area is defined by one or more network parameters exceeding a first predetermined threshold. The method further comprises wirelessly receiving, at a second base station, an attachment request by a first UE. The method further comprises rejecting the attachment request based on a determination that the second base station is disposed within the first coverage area.

According to another aspect of the technology described herein, a method for consolidating redundant base stations is provided, comprising determining that a first base station is within a first coverage area defined by one or more network parameters of a second base station. The method further comprises modifying one or more data repositories to indicate the first base station is on a denied list based on said determination. The method further comprises receiving a plurality of attachment requests from one or more UEs at the first base station. The method further comprises rejecting the plurality of attachment requests from the one or more UEs based on the first base station being on the denied list. The method further comprises determining that a number of attachment request rejections exceed a predetermined threshold. The method further comprises communicating a notification to a network operator of the first base station that the number of attachment request rejections has exceeded the predetermined threshold.

Figure 1:
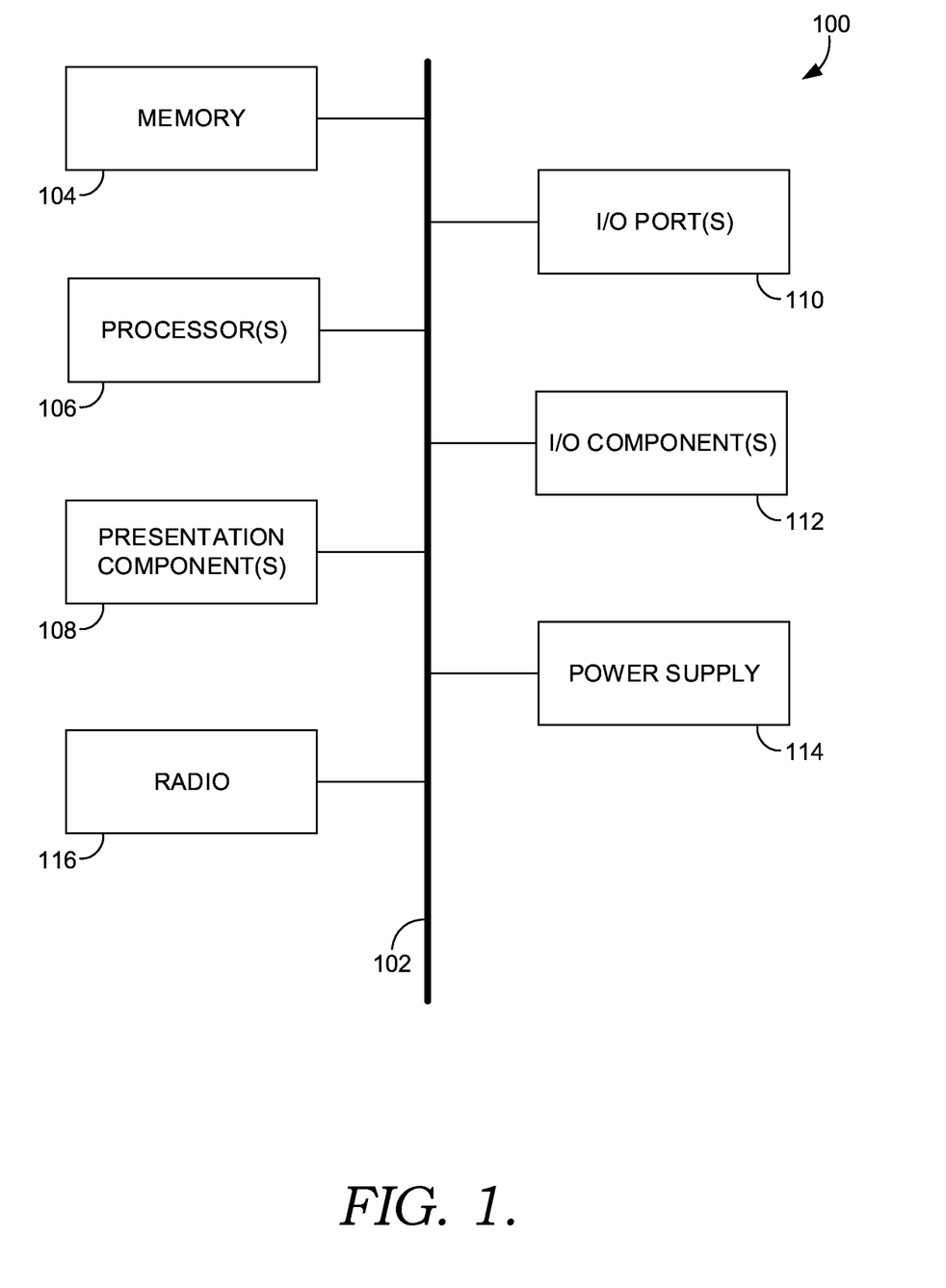
FIG. 1 illustrates an exemplary computing device for use with the present disclosure.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include equipment types identified by the GSMA, including mobile/feature phones, smart phones, tablets, IoT devices, wearable devices, dongles, modems, and WLAN routers, each of which may have any one or more components depicted in FIG. 1.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
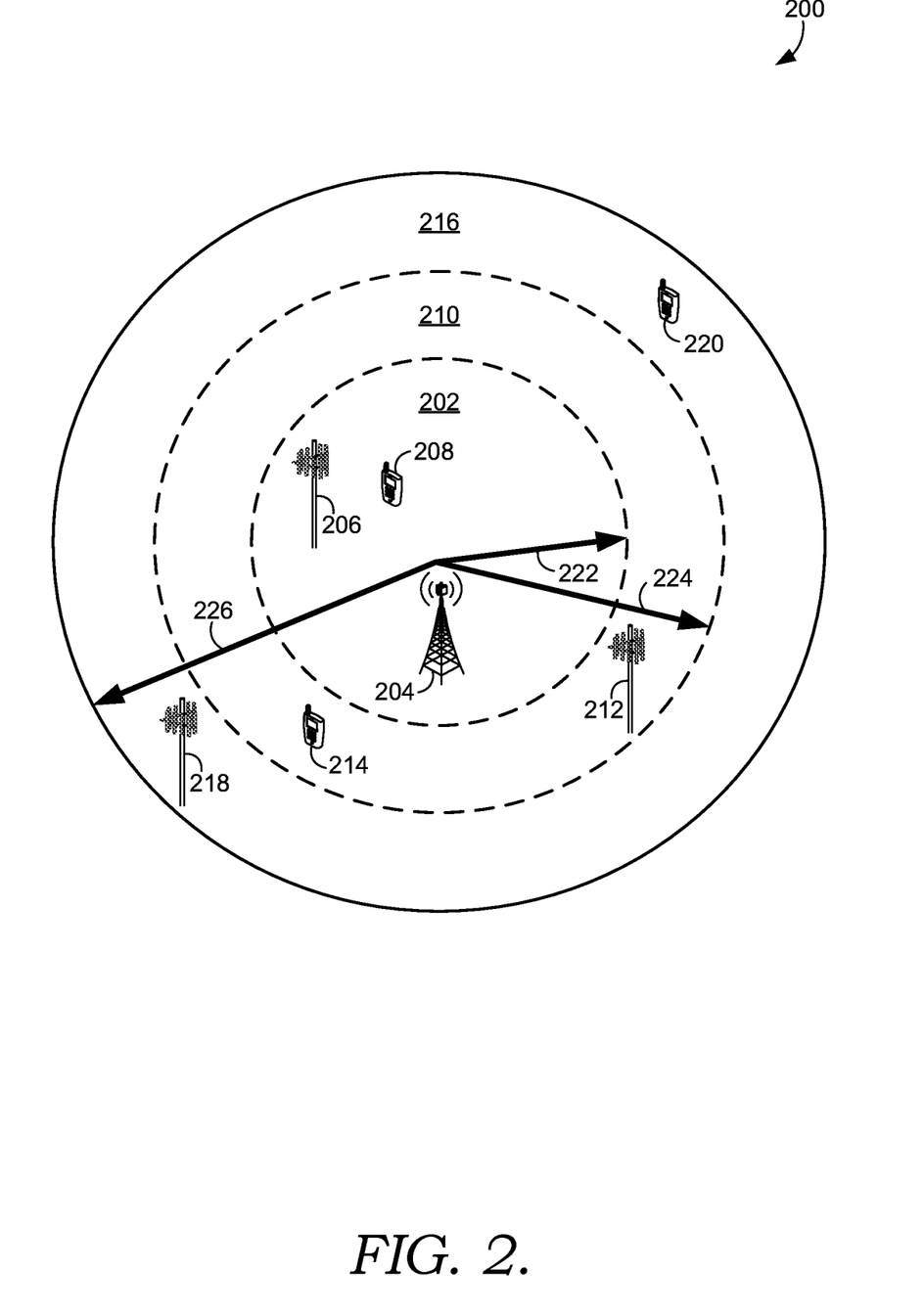
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a wireless telecommunication network. At a high level, the network environment 200 may generally be said to comprise one or more UEs, such as a first UE 208, a second UE 214, and a third UE 220. The network environment 200 may further be said to comprise a first set of base stations and a second set of base stations, wherein each of the first set of base stations and the second set of base stations are characterized by a different network characteristic. In one aspect, the network characteristic may be a network access technology; that is, the first set of base stations may utilize a first network access technology (i.e., a first wireless communication protocol such as 4G) and the second set of base stations may utilize a second network access technology (i.e. a second wireless communication protocol such as 5G). In another aspect, the network characteristic may be a network technology; that is, the first set of base stations may utilize a first network technology (e.g., 5G standalone) and the second set of base stations may utilize a second network technology (e.g., 5G non-standalone). In yet another aspect, the network characteristic may be an operator/carrier affiliation; that is, the first set of base stations may be affiliated with a first owner/operator/carrier (e.g., Sprint) and the second set of base stations may be affiliated with a second owner/operator/carrier (e.g., T-Mobile). It should be noted that thought the first set and second set of base stations may have more than one network characteristic that is different between the two sets, for the purposes of this disclosure, it is sufficient that each of the first and second sets of base stations can be characterized by at least one different network characteristic between the two sets.

In an illustrative example, the network environment 200 of FIG. 2 may be said to have fewer base stations in the first set of base stations than the second set of base stations, within a particular area. The first set of base stations may comprise the first base station 204 and the second set of base stations may comprise the second base station 206, the third base station 212, and the fourth base station 218. Each of the first, second, third, and fourth base stations may be configured to provide wireless telecommunication services within the network environment 200. The network environment 200 may be further described as comprising a plurality of zones vis-à-vis the first set of base stations; for example the network environment 200 may be said to comprise a first coverage area 202, a second coverage area 210, and a third coverage area 216. In the illustrated aspect seen in FIG. 2, since the first set of base stations only comprises the first base station, each of the first, second, and third coverage area may be generally circular, centered on the first base station 204. The first coverage area 202 may, therefore be defined as the area within a first radius 222 of the first base station, the second coverage area 210 may be said to be defined as the area between the first radius 222 and the second radius 224, and the third coverage area 216 may be said to be defined as the area between the second radius 224 and a third radius 226.

The boundaries of each particular coverage area may be defined based on one or more network parameters. Generally, a boundary between the first coverage area 202 and the second coverage area 210 may be based on where a first network parameter of the one or more network parameters crosses a first threshold and a boundary between the second coverage area 210 and the third coverage area 216 may be based on where the first network parameter of the one or network parameters crosses a second threshold. In one of many possible examples, if the first network parameter is associated with a downlink radio signal strength (e.g., reference signal received power (RSRP), the first boundary may be defined as where the downlink radio signal strength falls below a first threshold (e.g., −105 dBm) and the second boundary may be defined as where the downlink radio signal strength falls below a second threshold (e.g., −120 dBm). That is, if based solely on downlink radio signal strength, the first UE 208 may having an RSRP of −97 dBm would be in the first coverage area 202, the second UE 214 having an RSRP of −106 dBm would be in the second coverage area 210, and the third UE 220 having an RSRP of −123 dBm would be in the third coverage area 216. As mentioned, downlink radio signal strength is only one example of the one or more network parameters. In other aspects, the one or more network parameters may alternatively or additionally comprise one or more key performance indicators (KPIs), a signal quality parameter (e.g., reference signal receive quality (RSRQ)), an interference/noise parameter (e.g., SINR), signal band availability (e.g., low band (e.g., b71, n71, b2, etc.), mid band (e.g., b41, n41, etc.), or high band (e.g., 5 g NR FR2)), bandwidth (e.g., 5, 15, 30 MHz or the like), administrative factor (e.g., time of day, traffic load), or any other factor determined to be appropriate by a network operator/carrier.

The one or more network parameters may be geographic-based. In one aspect, the one or more network parameters may be UE-distance-based; that is, the entire second set of base stations may be on a denied list for the first UE 208 because it is within the first coverage area 202 based on being within a predetermined threshold distance from the nearest base station of the first set of base stations. For example, the first coverage area 202 may be defined as an area within a first distance of the nearest base station of the first set of base stations (e.g., if the first set of base stations consists of the first base station 204 and the first distance is 3 miles, the first coverage area 202 will be circular and defined by the first radius 222 being 3 miles). In another aspect, the one or more network parameters may be based on the distance between base stations. That is, all base stations of the second set of base stations may be on the denied list that are within the first coverage area 202 based on being within a predetermined threshold distance from the nearest base station of the first set of base stations. For example, if the first set of base stations consisted of the first base station 204, the first coverage area 202 may be defined as being generally circular having a first radius 222 (e.g., 3 miles), the second base station 206 was within 3 miles of the first base station 204, and each of the third and fourth base stations 212,218 were greater than three miles from the first base station 204, then the second base station may be placed on the denied list for any UE attempting to attach—regardless of the location of the UE.

The base station to which a particular UE may attach will depend on which base stations within the network environment 200 are placed on a denied list, and in some aspects, the location of a requesting UE. Cell selection and attachment procedures are well known in the art and will be followed to a significant extent in the course of the present disclosure. At a very high level and relevant to the present disclosure, a UE will perform cell selection under various circumstances. The UE may first attempt to select and attach to its most recent connected cell, using stored information cell selection, or initial cell selection, or using some other cell selection procedure. Based on the particular methodology used by the UE for cell selection and attachment, different solutions may be executed by the present disclosure in order to compel the UE to attach to certain base stations instead of others. For example, the first UE 208 may be in closer proximity to the second base station 206 than the first base station 204 and therefore may be inclined to select and attach to the second base station 206 (e.g., based on the signaling from the second base station 206 being preferable in one or more ways to the signaling from the first base station 204). The present disclosure modifies the cell selection procedure by adding one or more base stations of the second set of base stations to a denied list such that when the requesting UE attempts to attach to a base station on the denied list, the attach request is rejected by a network entity (e.g., Mobility Management Entity (MME) in a 4G network or Access Mobility Function (AMF) in a 5G network). The denied list may be automatically or manually populated and may be stored on a unified data repository in order that the network entity handling attach requests can access and query the list. After the attach request is rejected, the requesting UE will attempt to select and attach to other base stations until it selects one that is not on the denied list (at which point the conventional cell selection and attachment process resumes).

Because the present disclosure seeks to drive attachment to the first set of base stations within the network environment 200, attachment requests from requesting UEs will be handled differently based either on the location of the requesting UE or on the location of base stations within the network environment 200. For example, in aspects when the network receives an attach request from the first UE 208, the network may determine that the second set of base stations comprising the second, third, and fourth base stations 206, 212, and 218 should be added to the denied list on the basis that the first UE 208 is located within the first coverage area 202 and that sufficiently desirable connections can be provided to UEs such as the first UE 208 that are disposed within the first coverage area 202. When the network receives an attach request from the second UE 214, the network determines may determine that, based on the second UE 214's location in the second coverage area 210, the second set of base stations is either on the denied list (and reject the attach request), not on the denied list (allowing normal cell selection and attachment procedures to continue), or that the second set of bases stations is on a conditional list (allowing cell selection and attachment to the second set of base stations under a first set of circumstances and rejecting the attachment request under other circumstances).

Generally, any attachment request to a base station on the denied list will be rejected; however, the present disclosure recognizes several potential exceptions to that general rule. In a first aspect, the denied list will be ignored for attach requests based on the class or profile associated with a subscriber; for example, upon a determination that a subscriber is a member of a particular enterprise, wholesale, or mobile virtual network operators group, the denied list will be ignored and attachment requests to otherwise-denied base stations will be permitted. In another aspect, the denied list will be ignored based on the technical capabilities of a requesting UE; for example, in the process of determining whether an attachment request to a base station on the denied list should be approved or rejected, it may be determined that the requesting UE is not capable of attaching to the first set of base stations (e.g., the requesting UE is not 5G capable and the first set of base stations is a 5G network), in which case the denied list will be ignored and attachment requests to otherwise-denied base stations will be permitted.

One skilled in the art will recognize that numerous possible implementations are consistent with this disclosure. In but one of many possible examples of how attachment requests may be managed in network environment 200, the first set of base stations may be characterized as a 5G wireless network, the second set of base stations may be characterized as a 4G wireless network, and the one or more network parameters may comprise a plurality of factors that, together, represent an aggregate coverage score. The aggregate coverage score may take into account RSRP, RSRQ, SINR, and load associated with the first set of base stations. The aggregate coverage score may be calculated based on each factor falling within a range of values and assigned a score (e.g., if RSRP is greater than −80 dBm it is assigned 1 point, if between −80 dBm and −90 dBm it is assigned 2 points, if between −90 dBm and −100 dBm it is assigned 3 points, and if less than −100 dBm it is assigned 4 points). The first coverage area 202 may then be defined as that area where the total points of the four factors is less than a first threshold (e.g., 8 points), the second coverage area 210 may be defined as that area where the total points is between the first threshold and a second threshold (e.g., 16 points), and the third coverage area 216 may be defined as that area where the total points is greater than the second threshold.

Insofar as the UEs in network environment 200 are concerned, the first UE 208, being in the first coverage area 202 may be compelled to attach to the first set of base stations (e.g., the first base station 204) based on the relatively good coverage that the first set of base stations provides in that area. To execute the proper attachment to the first set of base stations, the network may, based on a determined location of the first UE 208, determine that the first UE is located in the first coverage area 202. The first UE 208 may be proactively instructed by the network to attach to any base station (e.g., the first base station 204) of the first set of base stations; alternatively, the network operator/carrier may create and maintain a denied list for any given area, wherein the second set of base stations are on the denied list while the first UE 208 is in the first coverage area 202, and wherein attachment requests will be denied if the first UE 208 attempts to attach to any base station on the denied list (forcing, through repeated attachment procedures, the first UE 208 to eventually attach to a base station of the first set of base stations). In some aspects, the denied list may be ignored (e.g., not queried, or overruled by a subsequent process) and therefore attachment requests to the second set of base stations from a UE in the first coverage area 202 would be permitted under carrier-designated circumstances (e.g., based on a UE being incompatible with the first set of base stations, the attach request being associated with high priority, emergency, or otherwise carrier-preferred traffic, excess traffic/load on the first set of base stations, or any other carrier-designated reason).

The second coverage area 210, being a transitional zone wherein the one or more network parameters are not as desirable as in the first coverage area 202 but better than the third coverage area 216, may treat attach requests from the second UE 214 in any of three ways that is desired by the network operator/carrier on the basis that the second UE 214 is determined to be located in the second coverage area. In a first aspect, the second UE 214, may be compelled to attach to the first set of base stations by placing the second set of base stations on the denied list. In a second aspect, the second UE 214 may be permitted to select and attach to any base station that is preferred according to conventional cell selection and attachment procedures. In a third aspect, the second UE 214 may be permitted to attach to the second set of base stations if they are selected according to conventional cell selection procedures if and only if one or more conditions exist; otherwise, if the one or more conditions are not met, an attachment request to any base station of the second set of base stations will be rejected and the second UE 214 will (eventually) select and attach to a base station of the first set of base stations. With respect to said aspect, the one or more conditions that would permit attachment to the second set of base stations may include a determination that the second UE 214 is requesting attachment for an emergency call (e.g., 911 call), a determination that the second UE 214 is requesting for high priority traffic (e.g., a call made using the government emergency telecommunications service), a determination that the second UE 214 is associated with an attachment request is associated with a is of a particularly high priority (e.g., wireless priority service subscribers), among others. It should be noted that the network operator/carrier may modify the treatment of attachment requests from UEs in any coverage area in order to best serve subscribers during a broad range of events (e.g., the network operator may permit all UEs to attach to any available base station during times of particularly high congestion or following a natural disaster/emergency) by temporarily suspending the rejection of attachment requests to base stations on the denied list. The third coverage area 216, being a zone wherein the one or more network parameters are not desirable, may treat attach requests from the second UE 214 as permitted to select and attach to any base station that is preferred according to conventional cell selection and attachment procedures.

Figure 3:
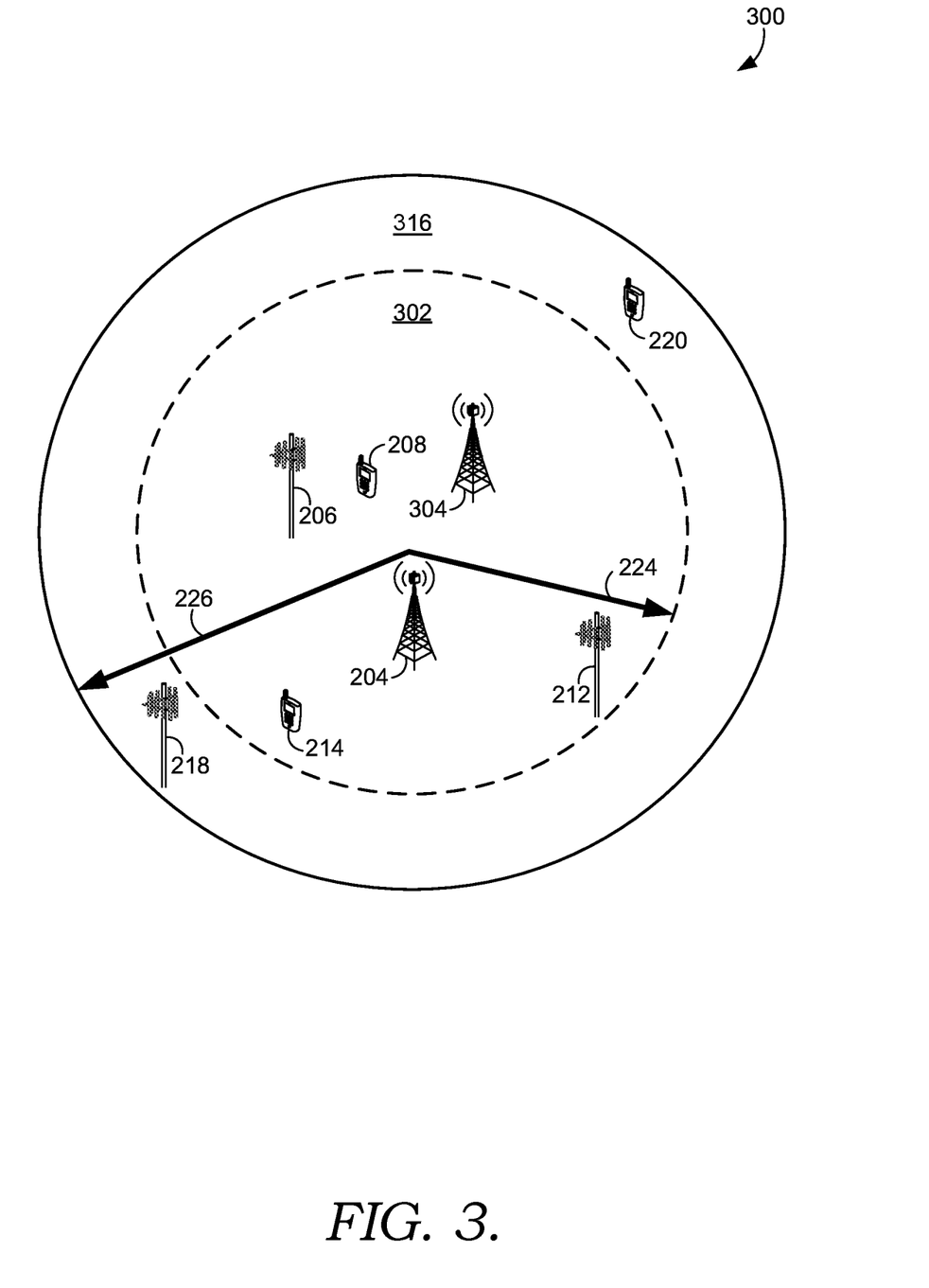
FIG. 3 illustrates a diagram of an exemplary network environment in which implementations of the present disclosure may be employed.

Turning now to FIG. 3, a network environment 300 is illustrated in accordance with aspects of the present disclosure. Network environment 300 includes all of the features of network environment 200 described with respect to FIG. 2, with the addition of a fifth base station 304. The fifth base station 304 may be said to be part of the first set of base station in addition to the first base station 204. With the addition of the fifth base station 304, a first coverage 302 may be approximately the same area as a combination of the first coverage area 202 and the second coverage area 210 of FIG. 2. In one aspect, FIG. 3 illustrates how the network environment 300 may simply contain only two coverage areas (the first coverage area 302 and third coverage 316), wherein the boundaries between the first and second coverage areas 302, 316 may be defined based on any one or more of the features described with respect to FIG. 2. That is, access requests by UEs in the first coverage area 302 (e.g., the first UE 208 and the second UE 214) may be rejected for one or more of the base stations of the second set of base stations or all access requests to any base station of the second set of base stations within the first coverage area 302 may be rejected (regardless of where the requesting UE is located). Access requests by UEs located inside the second coverage area 316 to one or more base stations of the second set of base stations may be conditionally permitted or allowed without condition, or access requests by any UE to a base station of the second set of base stations that is located in the second coverage area 316 may be conditional or allowed. In another aspect, FIG. 3 illustrates a second phase of a multi-phase transition from the second set of base stations to the first set of base stations; in other words, by adding the fifth base station 304 to the network environment 300, the first coverage area 302 expands, increasing the area for which attachment requests by UEs will be driven towards the first set of base stations and away from the second set of base stations. In such an aspect, the network operator may query the network to receive connection statistics or may be notified when attachments to a base station of the second set of base stations (e.g., the second base station 206) fall below a predetermined threshold, at which point the network operator may elect to remove the second base station 206 from service, or said base station having less than the predetermined threshold number of attachments may be automatically taken off line.

Figure 4:
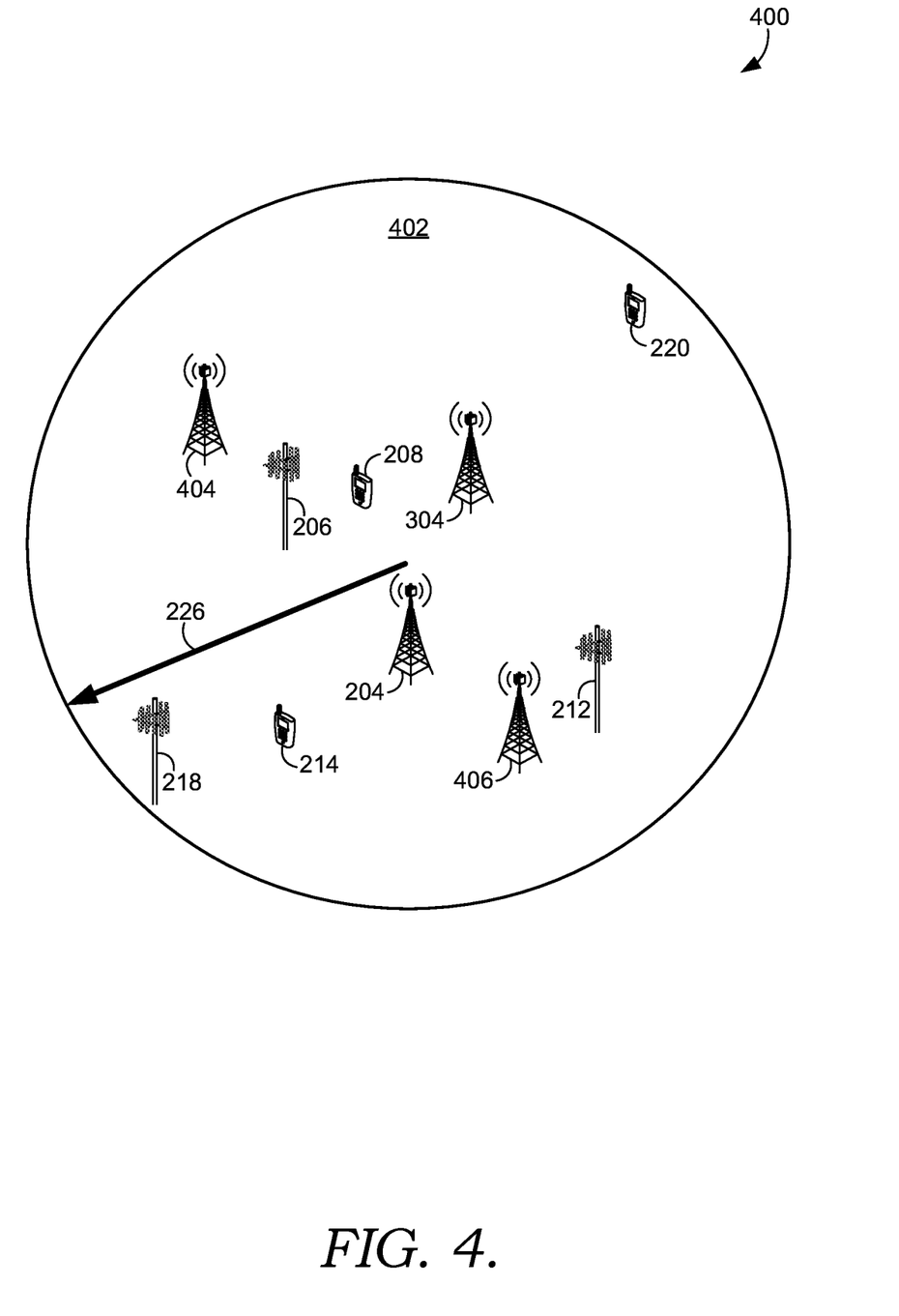
FIG. 4 illustrates a diagram of an exemplary network environment in which implementations of the present disclosure may be employed.

Turning now to FIG. 4, a network environment 400 is illustrated in accordance with aspects of the present disclosure. Network environment 400 includes all of the features of network environment 300 described with respect to FIG. 3, with the addition of a sixth base station 404. The sixth base station 404 may be said to be part of the first set of base station in addition to the first base station 204 and the fifth base station 304. With the addition of the sixth base station 404, a first coverage 402 may be approximately the same area as a combination of the first coverage area 302 and the second coverage area 316 of FIG. 3. In one aspect, FIG. 4 illustrates how the network environment 400 may simply contain only one coverage area. That is, access requests by UEs in the first coverage area 402 (e.g., the first UE 208, the second UE 214, and the third UE 220) may be rejected for one or more of the base stations of the second set of base stations or all access requests to any base station of the second set of base stations within the first coverage area 402 may be rejected (regardless of where the requesting UE is located). In another aspect, FIG. 4 illustrates a third phase of a multi-phase transition from the second set of base stations to the first set of base stations; in other words, by adding the sixth base station 404 to the network environment 400, the first coverage area 402 expands, increasing the area for which attachment requests by UEs will be driven towards the first set of base stations and away from the second set of base stations. In such an aspect, the network operator may query the network to receive connection statistics or may be notified when attachments to a base station of the second set of base stations (e.g., the third base station 212) fall below a predetermined threshold, at which point the network operator may elect to remove the third base station 212 from service (in addition to having previously removed the second base station 206 from service based on the deployment of the fifth base station 304), or said base station having less than the predetermined threshold number of attachments may be automatically taken off line.

Figure 5:
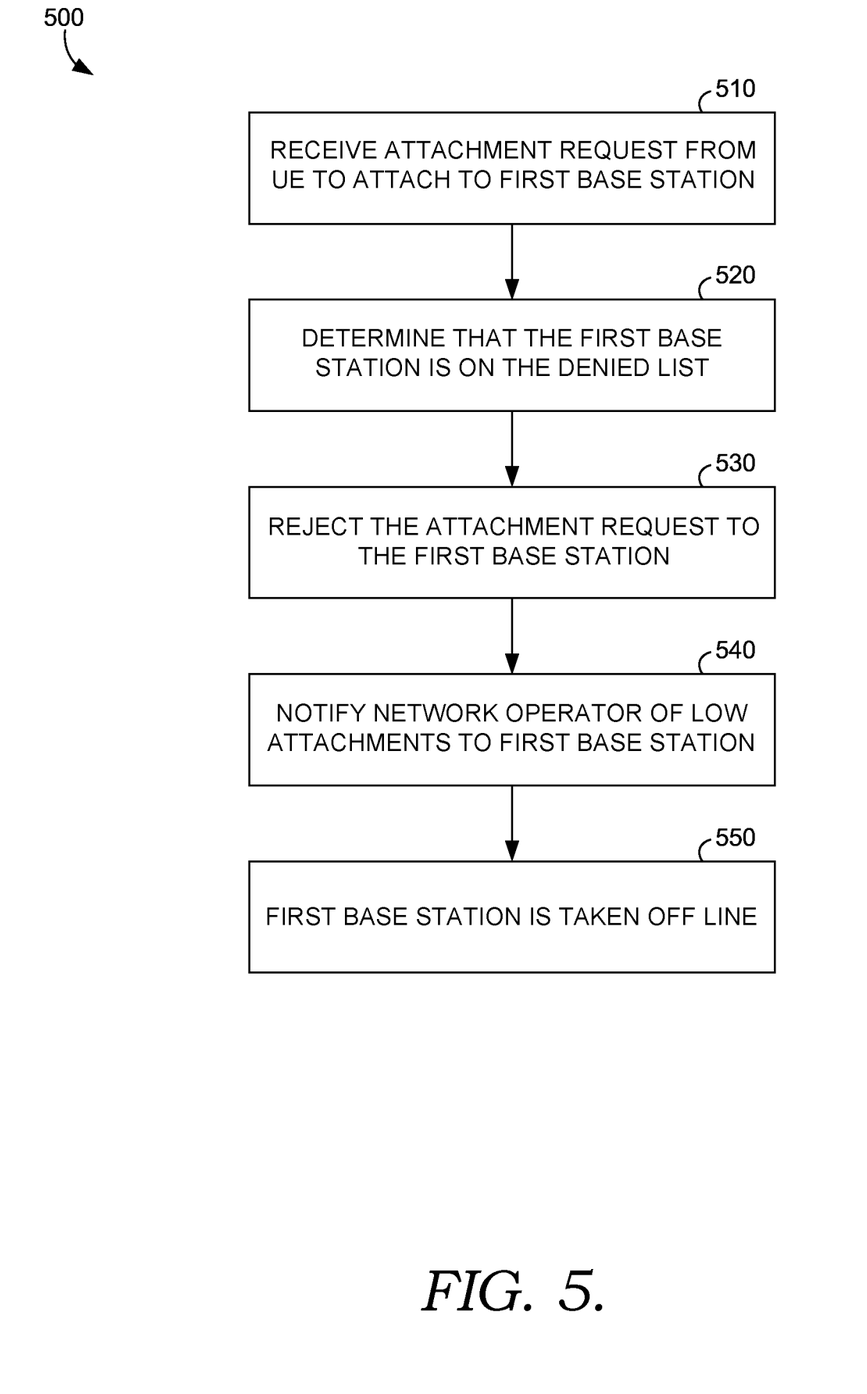
FIG. 5 depicts a flow diagram of an exemplary method for managing attachment requests, in accordance with embodiments described herein.

Turning now to FIG. 5, a flow chart is provided that illustrates one or more aspects of the present disclosure relating to a method 500 for managing access requests by a UE. At a first step 510, an attachment request is received by a UE to attach to a first base station having a first network characteristic, substantially as described with respect to any one or more features of FIG. 2. At a second step 520, it is determined that the first base station is on a denied list or a conditional list, based on a location of the UE and/or a location of the first base station, substantially as described with respect to any one or more features of FIG. 2. At a third step 530, the attachment request to the first base station is rejected and the UE attaches to a second base station having a second network characteristic, substantially as described with respect to any one or more features of FIG. 2. In some aspects, at a fourth step 540, a network operator is notified that the first base station has less than a predetermined threshold number of attachments. In addition to the fourth step 540 or in place of the fourth step 540, at a fifth step 550, the first base station is taken off line (whether automatically, or manually by the network operator) based on the first base station having less than the predetermined threshold number of attachments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for managing attachment requests comprising:
   determining a first coverage area and a second coverage area, the first coverage area comprising a first base station, wherein a first boundary between the first coverage area and the second coverage area is defined by one or more network parameters exceeding a first predetermined threshold, the first base station being a member of a first set of base stations characterized by using a first wireless communication protocol;
   wirelessly receiving, at a second base station, an attachment request by a first UE, the second base station being a member of a second set of base stations characterized by using a second wireless communication protocol different than the first wireless communication protocol; and
   causing the first UE to select the first base station by rejecting the attachment request based on a determination that the first UE is located within the first coverage area and a determination that the second base station is a member of the second set of base stations.

2. The method of claim 1, wherein the method further comprises accepting a second attachment request, wherein the second attachment request is received by the first base station.

3. The method of claim 1, wherein the second base station is located in the first coverage area.

4. The method of claim 1, wherein the second base station is located in the second coverage area.

5. The method of claim 4, wherein the one or more network parameters comprises a downlink signal strength indicator.

6. The method of claim 5, wherein the first base station is associated with a first network operator and the second base station is associated with a second network operator, the first network operator being different than the second network operator.

7. The method of claim 1, wherein the method further comprises:
   wirelessly receiving, at the second base station, a second attachment request by a second UE; and
   approving the attachment request based on a determination that the second UE is located outside the first coverage area.

8. The method of claim 7, wherein the method further comprises determining a third coverage area, wherein a second boundary between the second coverage area and the third coverage area is defined by one or more network parameters exceeding a second predetermined threshold, wherein approving the second attachment request is based on a determination that the second UE is located in the second coverage area and that the second attachment request is for traffic having a threshold-high priority.

9. The method of claim 7, wherein the method further comprises determining a third coverage area, wherein a second boundary between the second coverage area and the third coverage area is defined by one or more network parameters exceeding a second predetermined threshold, wherein approving the second attachment request is based on a determination that the second UE is located in the third coverage area.

10. A system for suspect device filtering in a wireless communication network, the system comprising one or more computer components configured to perform a method comprising:
    determining a first coverage area and a second coverage area, the first coverage area comprising a first base station, wherein a first boundary between the first coverage area and the second coverage area is defined by one or more network parameters exceeding a first predetermined threshold;
    wirelessly receiving, at a second base station, an attachment request by a first UE; and
    rejecting the attachment request based on a determination that the second base station is disposed within the first coverage area.

11. The system of claim 10, wherein the method further comprises accepting a second attachment request, wherein the second attachment request is received by the first base station.

12. The system of claim 10, wherein the first UE is located in the first coverage area.

13. The system of claim 10, wherein the first UE is located outside of the first coverage area.

14. The system of claim 10, wherein the first base station is associated with a first set of base stations having a first network characteristic, and wherein the first coverage area is defined as a geographic area within a predetermined distance of at least one base station of the first set of base stations, and wherein the second base station is of a second set of base stations, the second set of base stations having a second network characteristic different than the first network characteristic.

15. The system of claim 14, wherein the first network characteristic comprises being configured to wirelessly communicate with the first UE using a first network access technology and the second network characteristic comprises being configured to wirelessly communicate with the first UE using a second network access technology, the first network access technology being different than the second network access technology.

16. The system of claim 15, wherein rejecting the attachment request is further based on a determination that the first UE is compatible with the first network access technology.

17. The system of claim 14, wherein the first network characteristic comprises being associated with a first network operator and the second network characteristic comprises being associated with a second network operator, the first network operator being different than the second network operator.

18. A method for consolidating redundant base stations comprising:
    determining that a first base station is within a first coverage area defined by one or more network parameters of a second base station;
    modifying one or more data repositories to indicate the first base station is on a denied list based on said determination;
    receiving a plurality of attachment requests from one or more UEs at the first base station;
    rejecting the plurality of attachment requests from the one or more UEs based on the first base station being on the denied list;

determining that a number of attachment request rejections exceed a predetermined threshold;
communicating a notification to a network operator of the first base station that the number of attachment request rejections has exceeded the predetermined threshold.

19. The method of claim 18, wherein the first base station is associated with a first set of base stations having a first network characteristic, and wherein the first coverage area is defined as a geographic area within a predetermined distance of one or more base stations of a second set of base stations, the second set of base stations having a second network characteristic different than the first network characteristic.

\* \* \* \* \*